United States Patent [19]

Yang

[11] Patent Number: 5,127,779
[45] Date of Patent: Jul. 7, 1992

[54] MILLING DEVICES

[76] Inventor: Tai-Her Yang, 5-1 Taipin Street, Si-Hu Town, Dzan-Hwa, Taiwan

[21] Appl. No.: 577,856

[22] Filed: Sep. 5, 1990

Related U.S. Application Data

[63] Continuation-in-part of Ser. No. 378,366, Jul. 11, 1989, Pat. No. 5,002,443.

[51] Int. Cl.$^5$ .............................................. B23C 1/12
[52] U.S. Cl. .................... 409/201; 409/211; 409/216
[58] Field of Search .............. 29/27 C, 39, 40, 35.5; 409/201, 216, 211, 134, 204; 82/160

[56] References Cited

U.S. PATENT DOCUMENTS

| | | | |
|---|---|---|---|
| 4,478,540 | 10/1984 | Sachot | 409/211 |
| 4,635,329 | 1/1987 | Holy et al. | 29/39 |
| 4,945,620 | 8/1990 | Dassler | 29/39 |

FOREIGN PATENT DOCUMENTS

| | | | |
|---|---|---|---|
| 192221 | 8/1986 | European Pat. Off. | 29/27 A |
| 148112 | 7/1987 | Japan | 409/201 |

Primary Examiner—William Briggs

[57] ABSTRACT

A transmission mechanism for a milling device and an improvement in a ram type milling device having a swivel head structure. The ram is movable in opposite longitudinal directions. An auxiliary section is rotatably coupled to the ram for 0°-360° rotation relative thereto. An input head section that carries the output shaft, is rotatably coupled to the auxillary section for 0°-360° rotation relative to the auxillary section and/or the ram. The machine body of the device has a shaft hole formed therein for receiving one of the ends of a milling tool carried by the output shaft. Guide rail and guide feet are also provided for supporting and guiding the milling tool when desired. A milling tool carried therein by this device may be selectively moved in any of six directions or planes, as desired or needed for working on a workpiece.

4 Claims, 5 Drawing Sheets

MILLING DEVICES

CROSS-REFERENCE TO RELATED APPLICATIONS

The present application is a continuation-in-part of U.S. Pat. application Ser. No. 378,366 filed Jul. 11, 1989, now U.S. Pat. No. 5,002,443, and the contents of which are incorporated herein.

FIELD OF THE INVENTION

The present invention relates to milling devices and, in particular, to drive mechanisms for milling devices and to improvements to ram-type milling devices (machines).

BACKGROUND OF THE INVENTION

In conventional milling devices, including conventional vertically and horizontally movable ram-type milling devices and fixed head models, the drive means is associated with the machine head by means of conventional transmission structures, such as a bevel gear in either the head of the device or in the section that is adjacent to the drive means.

Conventional ram-type milling (tooling) machines have a ram that is able to longitudinally move forwardly and rearwardly They also include a universal main shaft head that is capable of selective 0°-360° rotation and positioning. Another auxiliary section is provided with one of its ends coupled to the base. The auxiliary section has a 45° bend formed therein, terminating in a forwarded output (inter-output) oblique plane. An output head section has a rearward coupling plane for coupling with the output oblique plane of the auxiliary section for selective 0°-360° rotation and positioning by either mechanical or manual means. This output head section carries an output shaft forwardly of the rearward coupling plane, so as to permit the shaft to be moved upward/downward, forward, leftward/rightward in five directions (planes) and block-free position adjustment for cutting workpieces. Also, this arrangement is useful as a common-type for driving the horizontal cutter shaft from the internal side by means of a vertical main shaft that has horizontal milling frame accessories affixed thereto. Unfortunately, the use and affixation of such accessories reduces the strength thereof and is not convenient. This arrangement can also be useful for common types to drive, from the internal side by the vertical shaft, by means located on top of the vertical cutter, head structure that is affixed to an auxiliary support arm. Unfortunately, the addition of such an auxiliary support arm increases the cost and weight of the device.

Also, for practical reasons, the output shaft often needs to be moved in a sixth direction (plane) to perform inward milling, such as on a universal milling machine.

As can be seen, there remains a need for improvements in transmission structures for milling devices and for improvements to ram-type milling devices that permit milling tools to rotate up to 360° relative to the ram, so that a milling tool carried thereby may be moved and adjusted in at least six different directions.

SUMMARY OF THE INVENTION

It is a primary object of the present invention to provide a ram-type milling device having elements associated with the ram and which may rotate up to 360° relative to the ram, so that a milling tool carried thereby may be moved and adjusted in at least six different directions.

It is a further primary object of the present invention to provide such a ram-type milling device that has elements for placing and securing a horizontal cutter bar, so as to permit vertical and horizontal operations.

It is a yet further object to the present invention to provide a transmission structure for use in milling devices, including ram-type milling devices.

In accordance with the teachings of the present invention, there is disclosed a structural improvement for a ram-type milling device of the type that includes:

The coupling plane of a longitudinally-adjustable ram terminates in an oblique plane that is positioned at a 45° angle relative to the remainder of the arm; an auxiliary section that includes a rearward coupling plane that is coupled to the oblique coupling plane of the ram and an opposite inter-outer plane. The auxiliary section further has a substantially 45° bend formed therein between the two planes thereof; an output head section is coupled with the inter-output plane of the auxiliary section. This output head carries the output shaft therein; the auxiliary section and the output section are independently rotatable up to 360° relative to the ram. In this manner, along with the longitudinal movement of the ram provided by appropriate means, the output shaft may be moved in either first or second longitudinal directions, as well as in respective third, fourth, fifth and sixth clockwise and counterclockwise rotational directions.

Further, the ram-type milling device of the present invention is equipped with a shaft hole formed therein below the ram. The shaft hole is provided, so that when the tool is a horizontal cutter bar, one of the ends of the bar (the forward end) is received and supported therein.

The bent, oblique or curved rams, auxiliary sections and/or output head sections described herein may be substituted by such conventional components as desired or needed, so that an overall 90° differential angle is provided therein.

In further accordance with the teachings of the present invention, there is disclosed a transmission device for a milling machine. A motive rotary power source is located at the head. Rotary power passes through the input interface of the auxiliary section and a 45° coupling plane of the ram. This rotary power is transmitted to the load side by means of a transmission shaft that is vertically disposed through the rotary center of the coupling plane. In this fashion, the conventional bevel gear assembly is replaced. If desired, such a transmission device may be connected with conventional transmission structures, such as a bevel gear located in the adjacent sections, by means of a transmission shaft that is vertically disposed through the center of a 45° coupling plane located between the drive mechanisms and the milling tool. Such a transmission mechanism is usable in both ram-type and fixed head milling machines.

These and other objects of the present invention will become readily apparent from a reading of the following specification, when taken in conjunction with the enclosed drawings.

DETAILED DESCRIPTION OF PREFERRED EMBODIMENTS

Referring now to the drawings, the present invention is hereby discussed and described with reference to ram-type milling devices. However, it is to be understood that the principles of the present invention are equally applicable for use in other milling devices.

The device of the present invention is applicable for and permits such inward movement of the output shaft in the sixth direction (plane) to perform inward milling. This is achieved by providing a shaft hole (which may either be a through hole or a blind-ended bore) which receives therein an end of the horizontal cutter shaft. The output shaft of such a device is then able to be moved in, and to do processing in, six directions (planes), as is shown in FIGS. 1A-1F.

With particular reference now to the figures, the various embodiments of the device of the present invention is illustrated. As can be seen, the device is an improvement in a ram-type milling device (machine) of the type that has a machine body, a ram that is carried by the machine body for sliding longitudinal movement of the ram in a first forward direction and in a second rearward direction. Conventional drive mechanisms or means are provided for longitudinally moving and selectively adjusting the longitudinal position of the ram. A conventional locking mechanism (means) is provided for locking the ram in the selected longitudinal position. A milling tool is operatively associated with the ram for concomitant longitudinal movement therewith in the first and second directions (planes). Finally, appropriate mechanisms (means) is provided for driving the milling tool.

Figure 1:
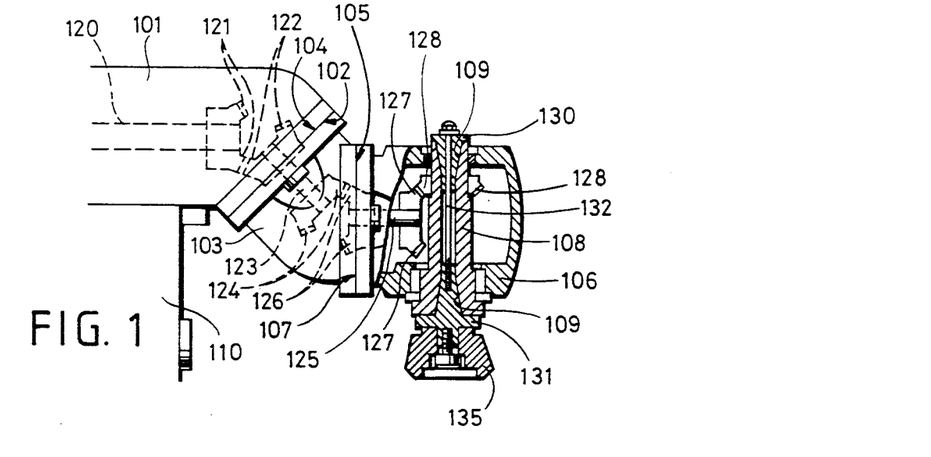
FIG. 1 is a side view of the present invention, with portions thereof broken away for the sake of clarity.
Figure 1A:
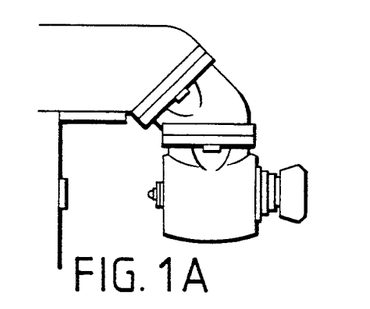
FIGS. 1A-1F illustrate the various six positions (planes) in which a tool carried by the device of the present invention may be selectively adjusted
Figure 1B:
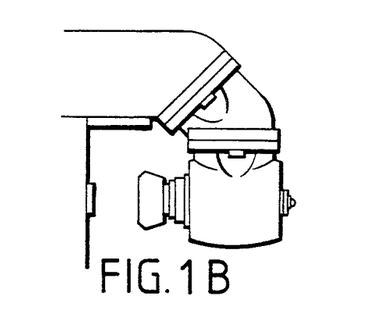
Figure 1C:
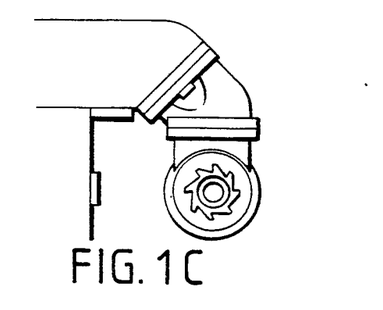
Figure 1D:
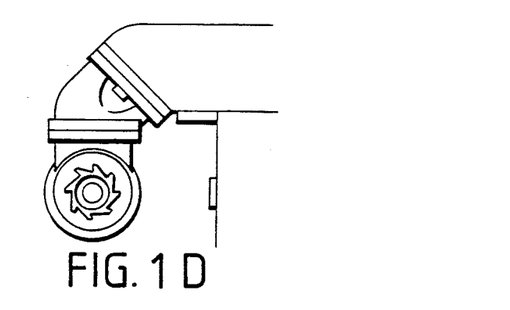
Figure 1E:
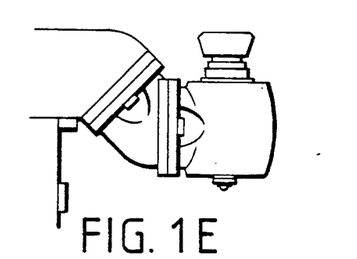
Figure 1F:
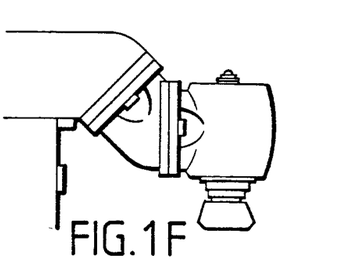
Figure 2:
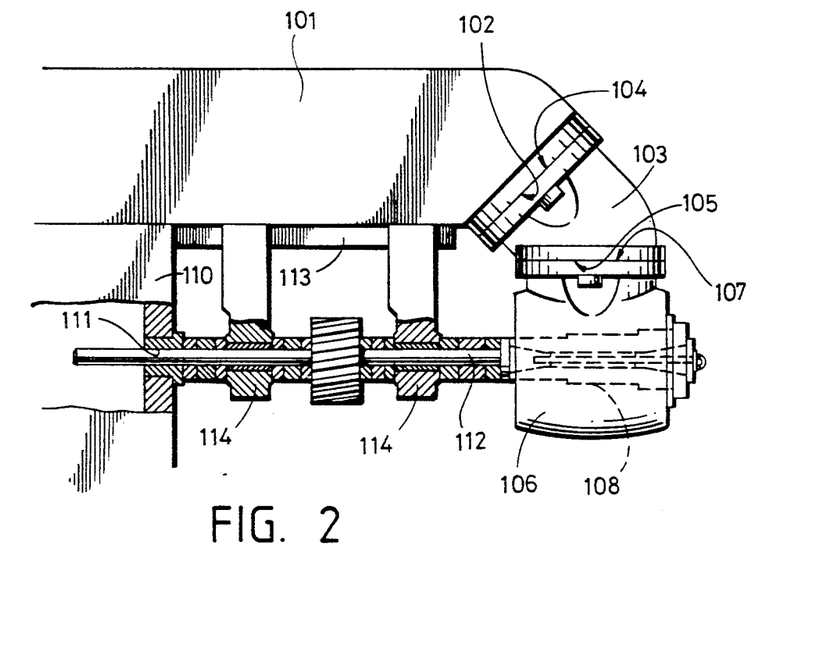
FIG. 2 is another side view of the device of the present invention with portions thereof broken away for the sake of clarity.
Figure 3:
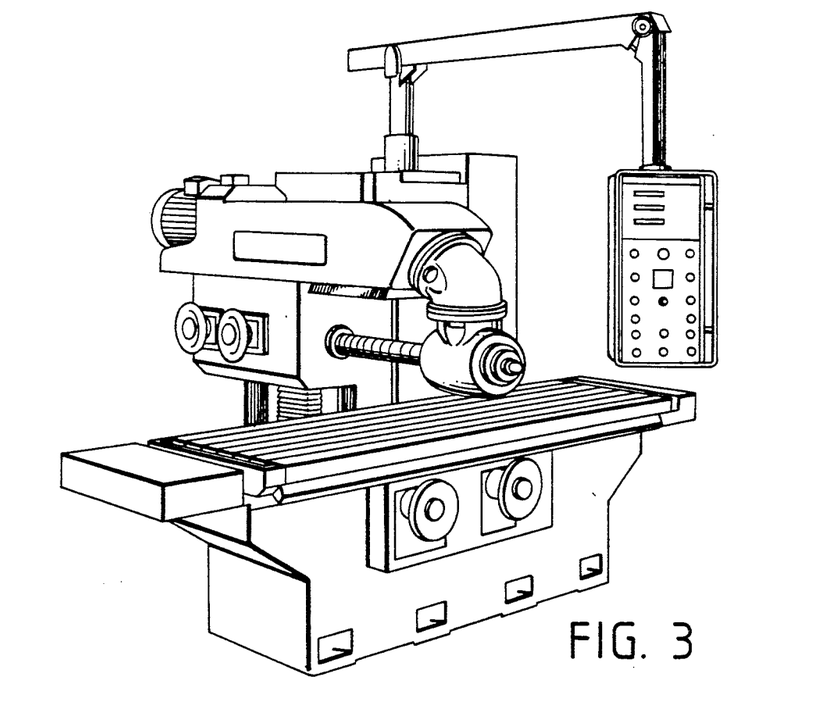
FIG. 3 is a perspective view of the ram-type milling device of the present invention.

Referring in particular now to FIGS. 1 and 2, in addition to the conventional structures noted above, in a first embodiment, the device of the present invention includes the following features:

the ram 101 which is able to shift (longitudinally move or slide) forward (in a first forward direction) and backward (in a second rearward direction) for adjustment and driving (i.e., during milling) has a forward end that extends from the machine body 110 and a second end that is operatively slidably connected thereto. The forward end of the ram 101 terminates in a 45° oblique plane 102 that is positioned at a 45° angle relative to the remainder of the ram 101.

An auxiliary section 103 having a forward output (inter-output) plane 105 and a rearward coupling plane 104 is provided. The rearward coupling plane 104 is parallel with and rotatably coupled to the forward end 102 of the ram 101. In this fashion, the auxiliary section 103 may be selectively rotated from between 0°–360° relative to the ram 101 (co-axial rotary adjustment). The auxiliary section 103 also has a substantially 45° bend formed therein for allowing the output plane 105 to be adjusted and locked relative to the ram 101 in any of various angles or on any of various planes.

An output head section 106 is provided having a rearward coupling plane 107 that is parallel with and rotatably coupled to the forward output plane 105. In this fashion, the output head section 106 may be selectively rotated and positioned from between 0°–360° relative to the ram 101 and the auxiliary section 103.

An output shaft 108, 602 is carried by the head section 106 forwardly of the rearward coupling plane 107. The output shaft 108, 602 has a longitudinal axis that is positioned, so as to be substantially parallel to the rearward coupling plane 107 of the head section 106. The output shaft 108, 602 further has a longitudinal bore (shaft hole) 109, 601 formed therein for receiving and securing the milling tool therein.

A transmission shaft 120 is connected to the power source for the tool. Attached to the end of the transmission shaft 120 is a first bevel gear 121 which is disposed in the forward end of the ram 101. A first intermediate shaft 123 extends from the forward end of the ram 101 into the auxiliary section 103 through the oblique plane 102 of the ram 101 and through the rearward coupling plane 104. The rearward end of the first intermediate shaft 123 is disposed in the forward end of the ram 101. A second bevel gear 122 is attached to the rearward end of the first intermediate shaft 123 which is opposite to the forward end of the intermediate shaft 123. The second bevel gear 122 cooperates with the first bevel gear 121 on the transmission shaft 120. The forward end of the first intermediate shaft 123 is disposed in the auxiliary section 103 and a third bevel gear 124 is connected to the forward end of the first intermediate shaft. A second intermediate shaft 125 extends from the auxiliary section 103, through the forward output plane 105 of the auxiliary section 103, through the rearward coupling plane 107 of the output head section 106, and into the output head section 106. A fourth bevel gear 126 is connected to the first end of the second intermediate shaft 125 in the auxiliary section 103. The fourth bevel gear 126 cooperates with the third bevel gear 124 on the first intermediate shaft 123. The second end of the second intermediate shaft 125 opposite to the first end of said shaft 125, has a fifth bevel gear 126 connected thereto. A sixth bevel gear 127 is connected to the output shaft 108 and cooperates with the fifth bevel gear 126 on the second intermediate shaft 125. In this manner, rotary movement of the transmission shaft is transmitted directly to the output shaft 108 through the series of bevel gears and shafts to drive the milling tool.

In the above manner, the milling tool may be moved in the first forward and second rearward longitudinal directions by longitudinal movement of the ram 101. Further, the tool may also be moved in a third clockwise and a fourth anticlockwise directions by rotational movement of the auxiliary section 103 and the head section 106 relative to the ram 101. Finally, the tool may also be moved in a fifth clockwise and a sixth anti-clockwise directions by rotational movement of the head section 106 relative to the auxiliary section 103 and the ram 101.

The longitudinal bore 109 in the output shaft 108 has an upper portion, a center portion and a lower portion. The upper portion and the lower portion are tapered outwardly from the center portion. The diameter of the center portion is substantially uniform. The diameter of the upper portion and the diameter of the lower portion increase in a direction outwardly from the center portion. A first collet 130 is disposed in the upper portion of the longitudinal bore 109 of output shaft 108. The outer walls of the collet 130 are tapered to cooperate with the tapered walls of the upper portion. A second collet 131 is disposed in the lower portion of the longitudinal bore 109 of output shaft 108. The outer walls of the collet 131 are tapered to cooperate with the tapered wall of the lower portion. An elongated threaded bolt or similar connecting means 132 connects the first collet 130 to the second collet 131 to retain the collets 130, 131 in the longitudinal bore 109. Further, means are provided to attach the milling tool 140 to the second collet 131.

The machine body 110 of the device (including those devices having a vertical column-type machine body or an elevated-type machine body) has a shaft hole (or a blind-ended bore) 111, 603, 802 formed therein located below the ram 101. In this fashion, when the tool is horizontal cutter bar 112, 602 having a first end received and secured in the longitudinal bore 109, 601 of the output shaft 108 and driven thereby, the second opposite end of the cutter bar is received in the shaft hole 111, 602, 802.

Further, the ram 101 has at least one lower guide rail 113 formed therein. Guide feet 114 are disposed on the guide rail(s) 113, so that the horizontal cutter bar 112 is supported by the feet 114. The guide feet 114 furthermore are adjustable along the length of the guide rail 113.

Figure 4:
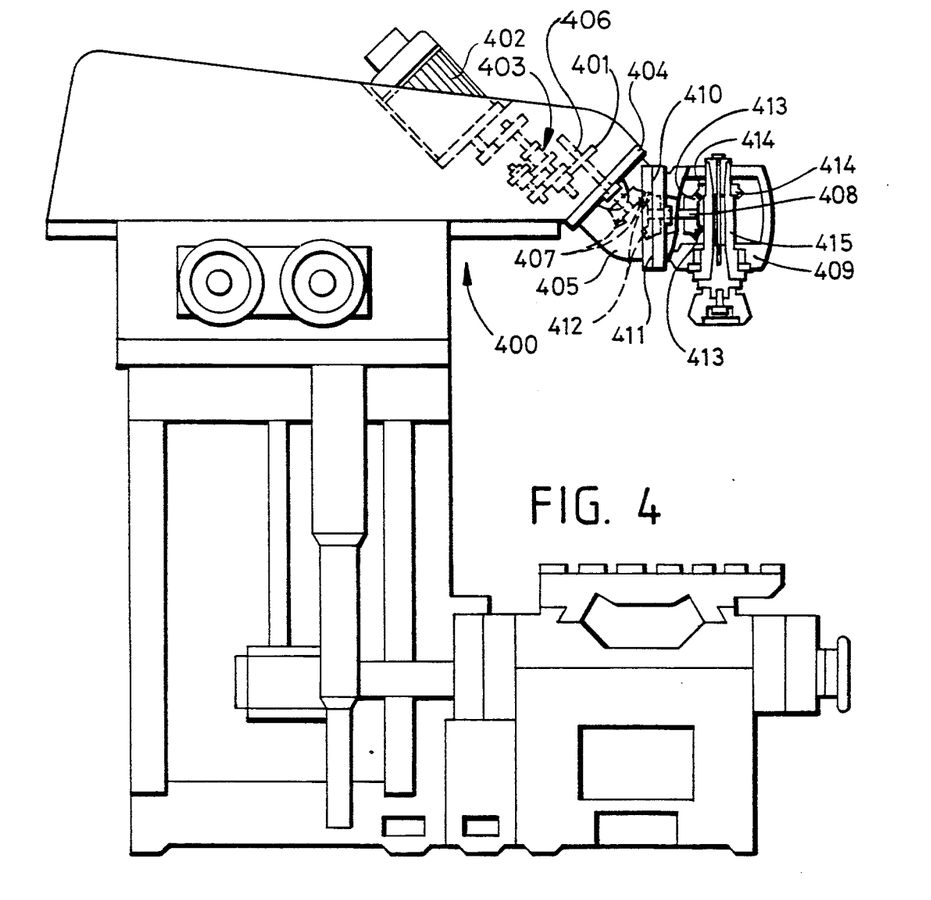
FIG. 4 is a side view of the milling device of the present invention having a portion thereto removed therefrom for revealing the transmission mechanism of the present invention.
Figure 5:
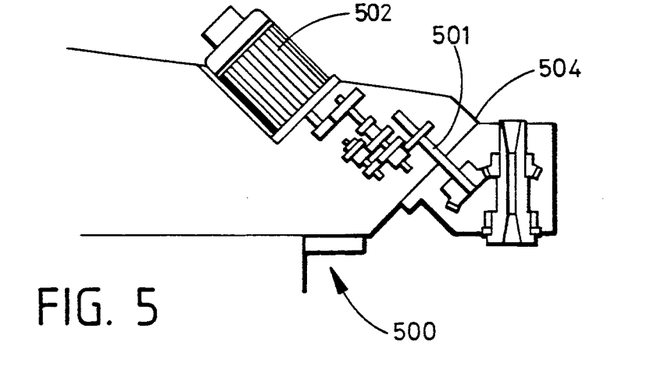
FIG. 5 is a side view of a conventional milling device with a portion thereof removed therefrom for revealing the transmission mechanism of the present invention.

With reference now to FIGS. 4 and 5, the transmission mechanism of the present invention is illustrated. A drive means or motive power source 402, 502 is situated on the machine 400, 500 at the ram thereof. Rotary power passes (is transmitted) through the input interface of the auxiliary section and the coupling plane 404, 504 of the ram. This power is then further transmitted to the load side of the machine 400, 500 by means of a transmission shaft 401, 501 that is substantially vertically disposed through the center of the coupling plane, as seen in FIGS. 4 and 5. The power source 402 is connected to a plurality of cooperating gears 403. The transmission shaft 401 has a first end and a second opposite end, the transmission shaft 401 extending through the coupling plane 404 of the ram and through the input outer face of the auxiliary section 405. The first end of the transmission shaft has a coupling gear 406 connected thereto. The coupling gear 406 cooperates with and is driven by the plurality of cooperating gears 403. The second end of the transmission shaft 401 is disposed in the auxiliary section 405. A first bevel gear 407 is connected to the second end of the transmission shaft 401. An intermediate shaft 408 has a first end and a second opposite end. The first end is disposed in the auxiliary section 405 and the second end is disposed in the output head section 409. The intermediate shaft 408 extends through the forward output plane 410 of the auxiliary section 405 and through the rearward coupling plane 411 of the output head section 409. A second bevel gear 412 is connected to the first end of the intermediate shaft 408, the second bevel gear 412 cooperating with the first bevel gear 407 on the second end of the transmission shaft 401. The second end of the intermediate shaft 408 has a third bevel gear 413 connected thereto. The third bevel gear 413 on the second end of the intermediate shaft 408 cooperates with a fourth bevel gear 414 which is connected to the output shaft 415. Drive of the power source 402 is transmitted directly to the transmission shaft 401 by the gearing system 403, 406 and by the bevel gears and intermediate shaft to the output shaft 415 which drives the milling tool. In this manner, the conventional bevel gear assembly may be replaced, thereby reducing costs and improving the efficiency of the device. Referring in particular now to FIG. 5, this transmission mechanism may be utilized in conventional, vertical-horizontal ram-type or fixed head milling devices by means of the transmission shaft 501 being substantially vertically disposed through the center of the 45° coupling plane located between the ram and the output section.

Figure 6:
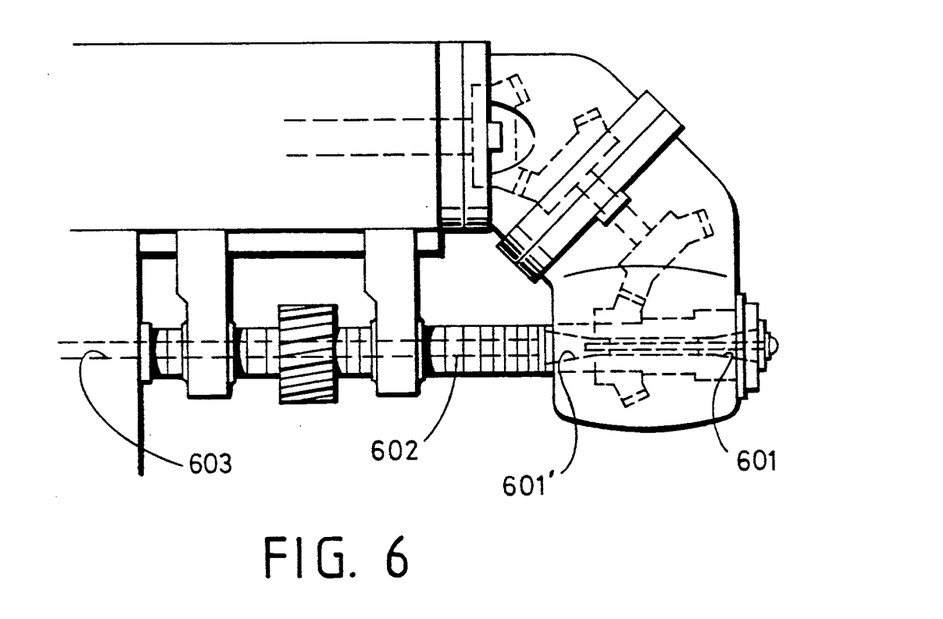
FIG. 6 is a side view of another embodiment of the device of the present invention.
Figure 7:
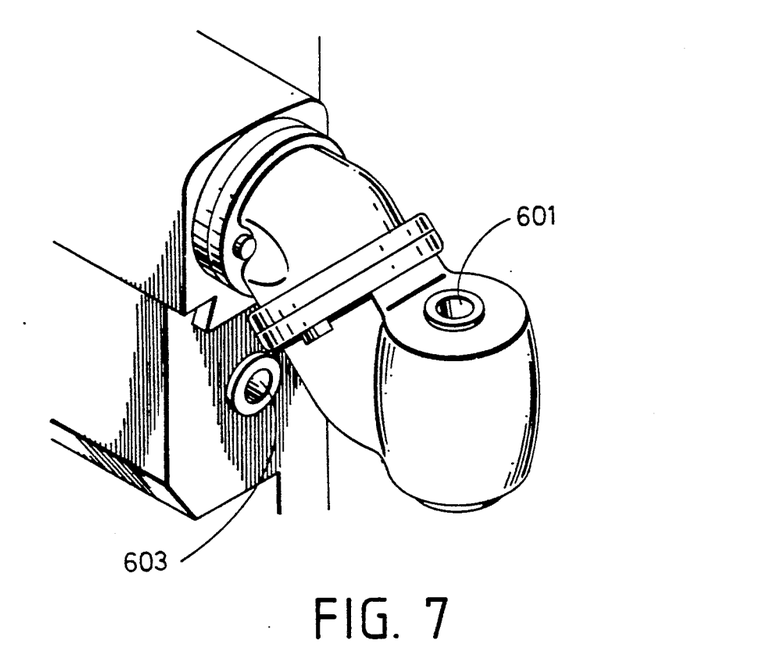
FIG. 7 is a perspective view, substantially corresponding to the embodiment of FIG. 6.

With reference now to FIGS. 6 and 7, a second embodiment of the device is illustrated. With the exception of those features to hereinafter be noted, the elements of this embodiment are the same as those of the embodiment seen in FIGS. 1 and 2.

In the embodiment of FIGS. 6 and 7, the forward end of the ram terminates in a substantially vertical plane that is located at a right (90°) angle relative to the longitudinal axis of the ram. The output head section has a substantially 45° bend formed therein between the rearward coupling end thereof and the output shaft 601 carried thereby. In this fashion, the output shaft 601 (and the milling tool 602 carried therein) is located, so that the longitudinal axis thereof is located on a substantially 45° angle relative to the rearward coupling plane of the head section.

Formed as described above, the second embodiment seen in FIGS. 6 and 7 is capable of selective adjustment and positioning in any of the six different directions (planes) mentioned above.

Figure 8:
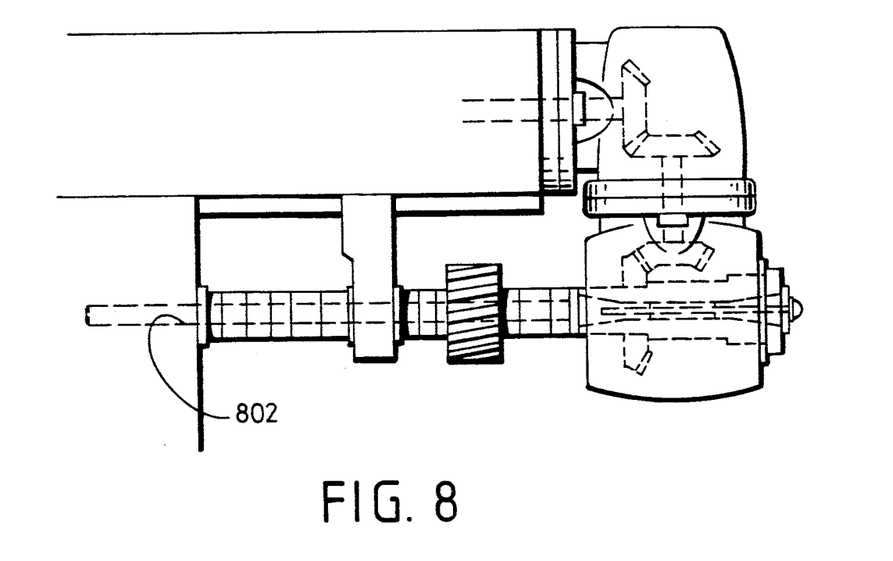
FIG. 8 is a side view of still another embodiment of the device of the present invention.
Figure 9:
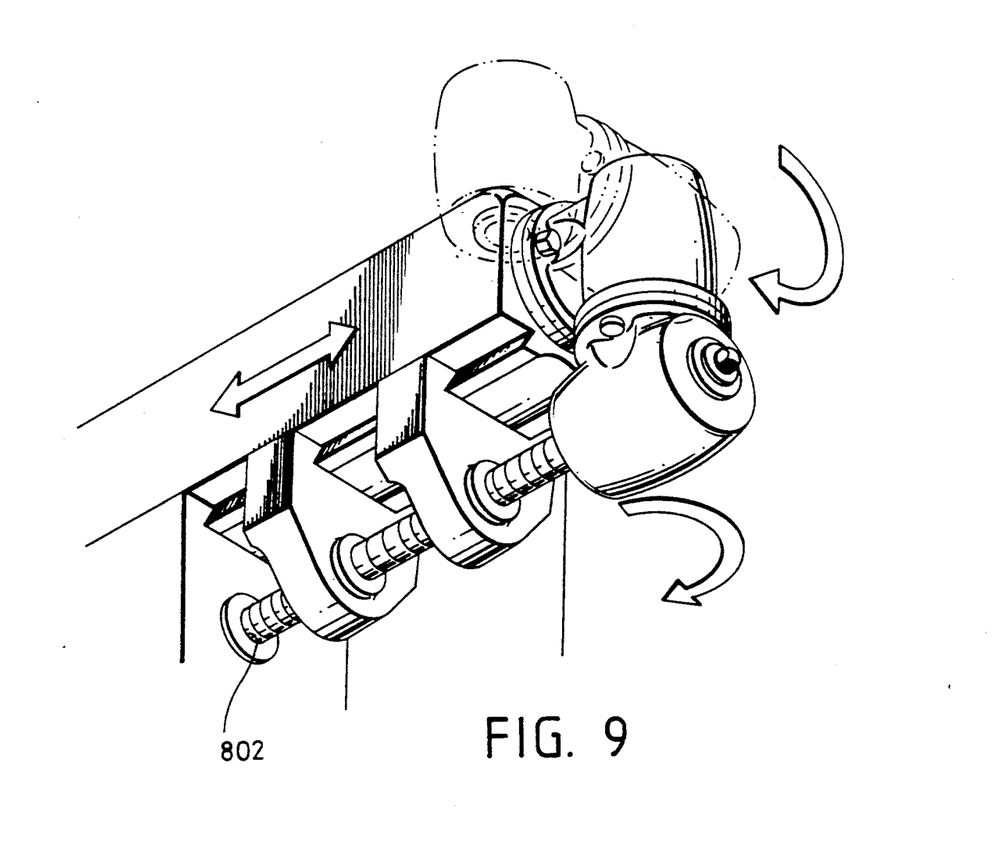
FIG. 9 is a perspective view substantially corresponding to the embodiment of FIG. 6 and further showing, by arrows and in phantom lines, the movement of the output shaft in the six different directions (planes).

With reference now to FIGS. 8 and 9, a third embodiment of the device is illustrated. Again, with the exception of those features to hereinafter be noted, the elements of this embodiment are the same as those of the embodiment seen in FIGS. 1 and 2.

In the embodiment of FIGS. 8 and 9, the forward end of the ram terminates in a substantially vertical plane that is located at a right (90°) angle relative to the longitudinal axis of the ram. The auxiliary section has a substantially ninety degree (90°) bend formed therein between the rearward coupling end thereof and output plane thereof. The head section is coupled by the rearward coupling end thereof to the output plane of the auxiliary section. The output shaft is carried by the head section along a longitudinal axis that is substantially parallel to the rearward coupling plane of the head section.

Formed as described above, the third embodiment seen in FIGS. 8 and 9 is capable of selective adjustment and positioning in any of the six different directions (planes) mentioned above.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. In a ram type milling device of the type having a machine body, a ram carried by the machine body for sliding longitudinal movement of the ram in a first forward and in a second rearward direction, means for longitudinally moving and selectively adjusting the longitudinal position of the ram, means for locking the ram in the selected longitudinal position, a milling tool in a head section operatively associated with the ram for concomitant longitudinal movement therewith in the first and second directions and a power source, the improvement thereupon comprised of:

the ram having a forward end that extends from the machine body and a second end that is operatively slidably connected to the machine body, the forward end of the ram terminating in an oblique plane being positioned at a 45° angle relative to the remainder of the ram;

an auxiliary section having a forward output plane and a rearward coupling plane, the rearward coupling plane being parallel with and rotatably coupled to the forward end of the ram, so that the auxiliary section may be selectively rotated from between 0°-360° relative to the ram, and the auxiliary section having a substantially 45° bend formed therein;

a transmission shaft connected to the power source for the milling tool, a first bevel gear attached to the transmission shaft and disposed in the forward end of the ram, a first intermediate shaft having a rearward end and an opposite forward end, the rearward end having a second bevel gear connected thereto, the second bevel gear cooperating with the first bevel gear on the transmission shaft, the forward end of the first intermediate shaft extending through the oblique plane of the ram and through the rearward coupling plane into the auxiliary section, the forward end of the first intermediate shaft having a third bevel gear connected thereto;

an output head section having a rearward coupling plane being parallel with the forward output plane and rotatably coupled thereto, so that the output head section may be selectively rotated from between 0°-360° relative to the ram and the auxiliary section;

a second intermediate shaft having a first end and a second opposite end, the first end of the second intermediate shaft being disposed in the intermediate section, the second intermediate shaft extending through the forward output plane of the intermediate section and through the rearward coupling plane of the output head section, the first end of the second intermediate shaft having a fourth bevel gear connected thereto, the fourth bevel gear cooperating with the third bevel gear on the first intermediate shaft, the second end of the second intermediate shaft having a fifth bevel gear connected thereto;

an output shaft carried by the head section forwardly of the rearward coupling plane, the output shaft having a longitudinal axis positioned so as to be substantially parallel to the rearward coupling plane of the head section, a sixth bevel gear connected to the output shaft and cooperating with the fifth bevel gear on the second intermediate shaft, the output shaft further having a longitudinal bore formed therein for receiving and securing the milling tool therein; and such that rotation of the transmission shaft produces rotation of the milling tool as the milling tool is moved in the first forward and second rearward longitudinal directions by longitudinal movement of the ram, as the tool is further moved in a third clockwise and a fourth anticlockwise directions by rotational movement of the auxiliary section and the head section relative to the ram, and as the tool is still further moved in a fifth clockwise and a sixth anticlockwise directions by rotational movement of the head section relative to the auxiliary section and the ram.

2. The ram type milling device of claim 1, further comprising the longitudinal bore in the output shaft having an upper portion, a center portion and a lower portion, the upper portion and the lower portion each being tapered outwardly from the center portion, a first collet disposed in the upper portion of the bore, a second collet disposed in the lower portion of the bore, means for connection the first collet and the second collet and means for connecting the milling tool to the second collet.

3. In a ram type milling device of the type having a machine body, a ram carried by the machine body for sliding longitudinal movement of the ram in a first forward and in a second rearward direction, means for longitudinally moving and selectively adjusting the longitudinal position of the ram, means for locking the ram in the selected longitudinal position, a milling tool in a head section operatively associated with the ram for concomitant longitudinal movement therewith in the first and second directions and a power source, the improvement thereupon comprised of:

the ram having a forward end that extends from the machine body and a second end that is operatively slidably connected to the machine body, the forward end of the ram terminating in a coupling plane being positioned at a 45° angle relative to the remainder of the ram;

an auxiliary section having a forward output plane and an input interface, the input interface being parallel with and rotatably coupled to the coupling plane on the forward end of the ram, so that the auxiliary section may be selectively rotated from between 0°-360° relative to the ram, and the auxiliary section having a substantially 45° bend formed therein;

a transmission shaft having a first end and a second opposite end, the transmission shaft extending through the coupling plane of the ram and through the input interface of the auxiliary section, the transmission shaft being located extending substantially vertically through the 45° coupling plane, the power source being connected to a plurality of cooperating gears, a coupling gear connected to the first end of the transmission shaft, the coupling gear cooperating with the plurality of gears whereby energizing the power source produces rotary motion in the transmission shaft, the second end of the transmission shaft having a first bevel gear connected thereto;

an output head section having a rearward coupling plane being parallel with the forward output plane and rotatably coupled thereto, so that the output head section may be selectively rotated from between 0°-360° relative to the ram and the auxiliary section;

an intermediate shaft having a first end and an opposite second end, the first end of the intermediate shaft being disposed in the intermediate section, the intermediate shaft extending through the forward output plane of the intermediate section and through the rearward coupling plane of the output head section, the first end of the intermediate shaft having a second bevel gear connected thereto, the second bevel gear cooperating with the first bevel gear on the transmission shaft, the second end of the second intermediate shaft having a third bevel gear connected thereto;

an output shaft carried by the head section forwardly of the rearward coupling plane, the output shaft having a longitudinal axis positioned so as to be substantially parallel to the rearward coupling plane of the head section, a fourth bevel gear connected to the output shaft and cooperating with the third bevel gear on the intermediate shaft, the output shaft further having a longitudinal bore formed therein for receiving and securing the milling tool therein; and such that rotation of the transmission shaft produces rotation of the milling tool as the milling tool is moved in the first forward and second rearward longitudinal directions by longitudinal movement of the ram, as the tool is further moved in a third clockwise and a fourth anticlockwise directions by rotational movement of the auxiliary section and the head section relative to the ram, and as the tool is still further moved in a fifth clockwise and a sixth anticlockwise directions by rotational movement of the head section relative to the auxiliary section and the ram.

4. The ram type milling device of claim 3, further comprising the longitudinal bore in the output shaft having an upper portion, a center portion and a lower portion, the upper portion and the lower portion each being tapered outwardly from the center portion, a first collet disposed in the upper portion of the bore, a second collet disposed in the lower portion of the bore, means for connecting the first collet and the second collet and means for connecting the milling tool to the second collet.

* * * * *